(12) United States Patent
Ma et al.

(10) Patent No.: US 9,207,765 B2
(45) Date of Patent: Dec. 8, 2015

(54) RECOGNIZING INTERACTIVE MEDIA INPUT

(75) Inventors: Lei Ma, Beijing (CN); Qiang Huo, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 394 days.

(21) Appl. No.: 12/651,305

(22) Filed: Dec. 31, 2009

(65) Prior Publication Data

US 2011/0157012 A1  Jun. 30, 2011

(51) Int. Cl.
| | |
|---|---|
| *G06F 3/01* | (2006.01) |
| *G06F 3/023* | (2006.01) |
| *G06F 3/0488* | (2013.01) |
| *A63F 13/20* | (2014.01) |
| *H04N 21/4223* | (2011.01) |
| *H04N 21/44* | (2011.01) |
| *H04N 21/475* | (2011.01) |
| *H04N 21/482* | (2011.01) |

(52) U.S. Cl.
CPC ............... *G06F 3/017* (2013.01); *A63F 13/06* (2013.01); *G06F 3/0236* (2013.01); *G06F 3/0237* (2013.01); *G06F 3/04883* (2013.01); *H04N 21/4223* (2013.01); *H04N 21/44008* (2013.01); *H04N 21/4753* (2013.01); *H04N 21/482* (2013.01); *A63F 2300/1093* (2013.01); *A63F 2300/6045* (2013.01)

(58) Field of Classification Search
CPC ... G06F 3/017; G06F 3/0488; G06F 3/04883; G06F 3/0481; G06F 3/04812; G06F 3/0482; G06F 3/0237; G06F 3/04815; G06F 3/04817; G06F 17/3053; G06F 3/0236

USPC .......... 345/156, 158, 157, 619, 642; 715/863, 715/856, 702, 716
See application file for complete search history.

(56) References Cited

U.S. PATENT DOCUMENTS

| | | | | |
|---|---|---|---|---|
| 5,252,951 | A * | 10/1993 | Tannenbaum et al. | 345/156 |
| 5,870,492 | A * | 2/1999 | Shimizu et al. | 382/187 |
| 6,044,165 | A * | 3/2000 | Perona et al. | 382/103 |
| 6,115,482 | A * | 9/2000 | Sears et al. | 382/114 |
| 6,121,969 | A * | 9/2000 | Jain et al. | 715/850 |
| 6,249,606 | B1 * | 6/2001 | Kiraly et al. | 382/195 |
| 6,400,996 | B1 * | 6/2002 | Hoffberg et al. | 700/83 |

(Continued)

OTHER PUBLICATIONS

Oka, et al., "Real-Time Tracking of Multiple Fingertips and Gesture Recognition for Augmented Desk Interface Systems", IEEE Computer Society, In the Proceedings of the Fifth IEEE International Conference on Automatic Face and Gesture Recognition, May 2002, 6 pgs.

(Continued)

*Primary Examiner* — Michael J Eurice
(74) *Attorney, Agent, or Firm* — Micah P. Goldsmith; Judy Yee; Micky Minhas (57) ABSTRACT

Techniques and systems for inputting data to interactive media devices are disclosed herein. In some aspects, a sensing device senses an object as it moves in a trajectory indicative of a desired input to an interactive media device. Recognition software may be used to translate the trajectory into various suggested characters or navigational commands. The suggested characters may be ranked based on a likelihood of being an intended input. The suggested characters may be displayed on a user interface at least in part based on the rank and made available for selection as the intended input.

17 Claims, 8 Drawing Sheets

(56) References Cited

U.S. PATENT DOCUMENTS

| | | | |
|---|---|---|---|
| 6,525,749 B1* | 2/2003 | Moran et al. | 715/863 |
| 6,801,190 B1* | 10/2004 | Robinson et al. | 345/173 |
| 6,850,252 B1* | 2/2005 | Hoffberg | 715/716 |
| 6,907,581 B2* | 6/2005 | Noy et al. | 715/863 |
| 7,042,442 B1* | 5/2006 | Kanevsky et al. | 345/169 |
| 7,180,500 B2* | 2/2007 | Marvit et al. | 345/156 |
| 7,453,439 B1* | 11/2008 | Kushler et al. | 345/168 |
| 8,013,837 B1* | 9/2011 | Schroeder | 345/157 |
| 8,619,048 B2* | 12/2013 | Shimoni | 345/173 |
| 2001/0030668 A1* | 10/2001 | Erten et al. | 345/863 |
| 2002/0036617 A1* | 3/2002 | Pryor | 345/156 |
| 2002/0109677 A1* | 8/2002 | Taylor | 345/173 |
| 2002/0151992 A1* | 10/2002 | Hoffberg et al. | 700/83 |
| 2002/0168107 A1* | 11/2002 | Tang et al. | 382/187 |
| 2003/0016252 A1* | 1/2003 | Noy et al. | 345/856 |
| 2004/0130620 A1* | 7/2004 | Buehler et al. | 348/143 |
| 2004/0140956 A1* | 7/2004 | Kushler et al. | 345/168 |
| 2004/0155869 A1* | 8/2004 | Robinson et al. | 345/168 |
| 2004/0196256 A1* | 10/2004 | Wobbrock et al. | 345/156 |
| 2005/0020303 A1* | 1/2005 | Chan | 455/556.1 |
| 2005/0169527 A1* | 8/2005 | Longe et al. | 382/177 |
| 2005/0174333 A1* | 8/2005 | Robinson et al. | 345/168 |
| 2005/0210417 A1* | 9/2005 | Marvit et al. | 715/863 |
| 2006/0013473 A1* | 1/2006 | Woodfill et al. | 382/154 |
| 2006/0274051 A1* | 12/2006 | Longe et al. | 345/173 |
| 2007/0070038 A1* | 3/2007 | Hoffberg et al. | 345/156 |
| 2007/0156677 A1* | 7/2007 | Szabo | 707/5 |
| 2008/0100579 A1* | 5/2008 | Robinson et al. | 345/168 |
| 2008/0178126 A1* | 7/2008 | Beeck et al. | 715/863 |
| 2009/0027337 A1* | 1/2009 | Hildreth | 345/158 |
| 2009/0177301 A1* | 7/2009 | Hayes | 700/94 |
| 2009/0214117 A1* | 8/2009 | Ma et al. | 382/187 |
| 2009/0284471 A1* | 11/2009 | Longe et al. | 345/168 |
| 2009/0319181 A1* | 12/2009 | Khosravy et al. | 701/208 |

OTHER PUBLICATIONS

Rekimoto, "GestureWrist and GesturePad: Unobtrusive Wearable Interaction Devices", Retrieved on May 26, 2010 at <<http://www.sonycsl.co.jp/person/rekimoto/papers/iswc01.pdf>> pp. 1-7 (Published by IEEE Computer Society, In the Proceedings of the 5th IEEE International Symposium on Wearable Computers, Oct. 2001, 7 pgs.

Starner, et al., "Computer Vision-Based Gesture Tracking, Object Tracking, and 3D Reconstruction for Augmented Desks", Retrieved on May 26, 2010 at <<http://www.vision.ee.ethz.ch/~bleibe/papers/starner-perceptive-mva02.pdf>>, Published Apr. 2003, pp. 1-13.

Starner, et al., "The Perceptive Workbench: Computer-Vision-Based Gesture Tracking, Object Tracking, and 3D Reconstruction for Augmented Desks", Springer Berlin/Heidelberg, Machine Vision and Applications, Special Issue on Computer Vision Systems, Apr. 2003, vol. 14, No. 1, pp. 59-71.

* cited by examiner

RECOGNIZING INTERACTIVE MEDIA INPUT

BACKGROUND

A combination of low-cost broadband networking and digital compression techniques has enabled a widespread deployment of interactive media devices. As part of the interactive media experience, users often input data to the interactive media devices. For example, in the context of an interactive gaming application, a user may input text to answer questions such as a date the user was born.

Many interactive media devices do not include a keyboard. As a substitute, some interactive media devices may provide a virtual keyboard to the user via a user interface. For example, the virtual keyboard may be presented in the form of a traditional keyboard that is projected on a monitor. The user can input text with a controller by navigating a cursor or selection box around the virtual keyboard to select various letters as input data. However, using the virtual keyboard to input data is typically time consuming because the user has to select the desired input from among all possible characters and/or symbols present in the virtual keyboard.

In addition, the virtual keyboard is generally limited to inputting textual data in Western speaking languages, which have a relatively concise alphabet. For East Asian languages in their traditional form such as Chinese, Japanese, and Korean, however, it is often difficult or impossible to input data using a virtual keyboard due to the number of characters in the language.

SUMMARY

Techniques and systems for inputting data to an interactive media device is disclosed herein. In some aspects, a sensing device tracks movement of an object through space as the object moves in a trajectory indicative of an input desired by a user. A tracking module may record the trajectory, which may be processed by recognition software to translate the trajectory into a recognized input for use by the interactive media device.

In some aspects, the recognition software may translate the trajectory into suggested characters. The suggested characters displayed on a selection window of a user interface for selection of the desired input. In some aspects, the recognition software may translate the trajectory into navigational commands that may be used to interact with a user interface, such as navigate through a television program guide, a video game, and so forth.

In further aspects, the interactive media device may rank the suggested characters based on a likelihood of being an intended input. The ranked suggested characters may be displayed on the selection window such that a highest ranked suggested character is displayed closest to an end point of the trajectory.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the examples shown in the accompanying figures. In the figures, the left-most digit(s) of a reference number identifies the figure in which the reference number first appears. The same reference numbers in different figures indicate similar or identical items.

DETAILED DESCRIPTION

Overview

Recognizing a trajectory of an object as input to an interactive media device may enhance a user's interactive media experience. Moving the object in a trajectory indicative of a desired input reduces the time it takes to input data (e.g., textual characters, navigational commands, etc.) and expands a selection of languages, characters, and navigational commands available for input to the interactive media device.

In various embodiments, a sensing device may sense an object as it moves in a trajectory through space that is indicative of a desired input. For example, if a user desires to enter the letter "m" into an input box of an interactive gaming device, the user may pick up an object such as an apple and write the letter "m" in space (in the air) with the apple as if the apple were a piece of chalk and the user was writing the letter "m" on an imaginary chalk board.

A tracking module may record the trajectory of the object and an input recognition module may translate the trajectory into an input recognizable by the interactive media device. For example, if a user writes the letter "m" in space with an apple, a camera may capture a video sequence of the sensed environment, which may be analyzed to track the movement of the apple. A handwriting recognition module of the input recognition module may translate the derived trajectory to input the letter "m" into the text box of the gaming device.

While the above description includes references to recognizing Western alphabetic textual input to an illustrative gaming device, embodiments are not limited to Western alphabetic textual inputs, but may be used with other type of input such as navigational inputs, alpha-numeric character inputs, East Asian pictographic character inputs, etc. Furthermore, embodiments are not limited to gaming devices, but may be used with other interactive media devices such as interactive television devices, set top boxes, personal computing devices, and so forth.

The processes and systems described herein may be implemented in a number of ways. Example implementations are provided below with reference to the following figures.

Illustrative Environments

Figure 1:
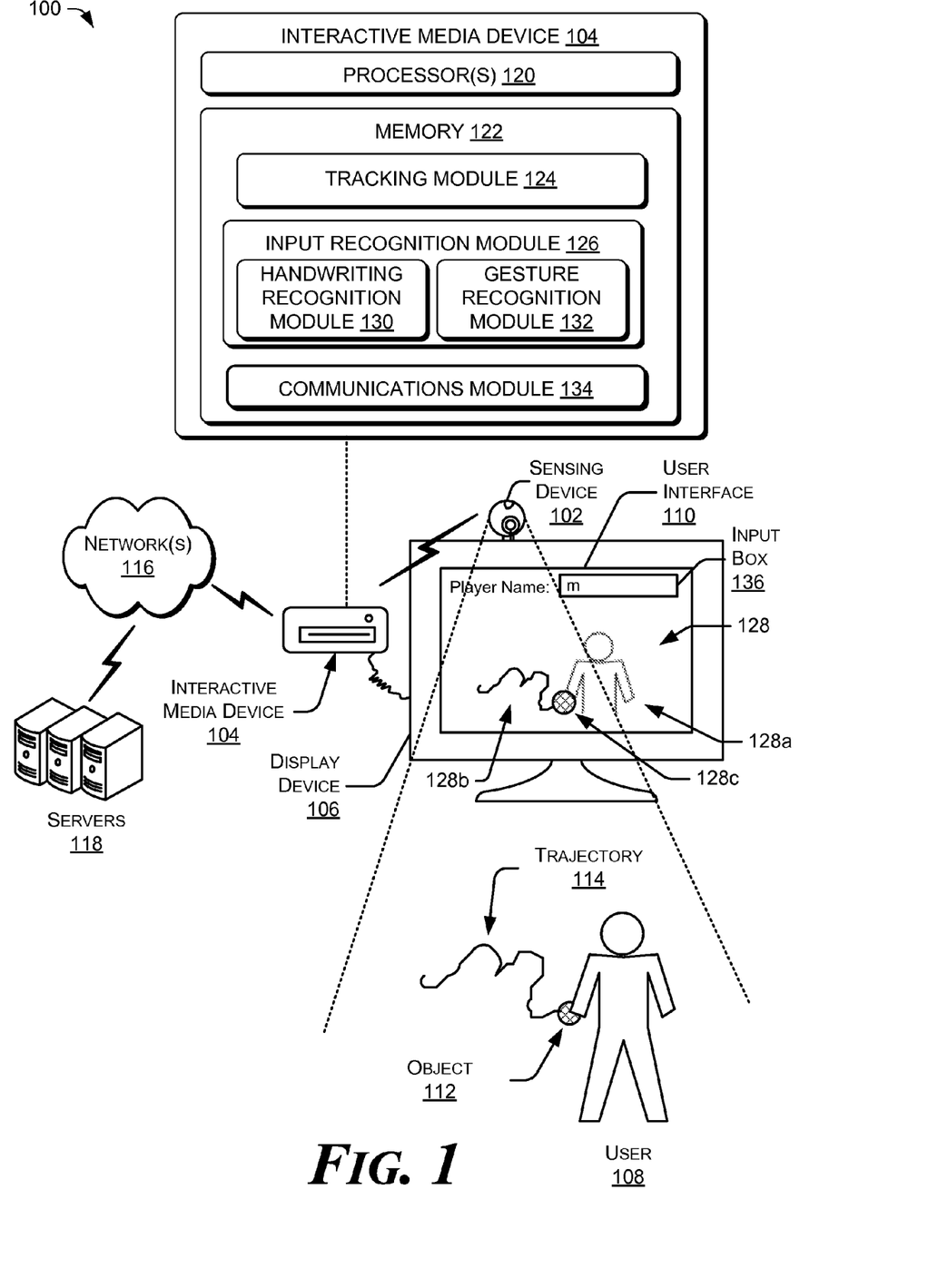
FIG. 1 is an illustrative interactive media device for recognizing input data based on movement of an object sensed by a visual sensing device.

FIG. 1 is an illustrative environment 100 for recognizing input data. The environment 100 may include a visual sensing device 102 in visual communication with an interactive media device 104. The interactive media device 104 may be displayed to a display device 106. A user 108 may interact with the interactive media device 104 via a user interface 110 made visible via the display device 106. For example, in an interactive gaming embodiment, the interactive media device 104 may be a gaming device displayed to the display device 106 so that the user 108 can interact with the games via the user interface 110.

The visual sensing device 102 may sense an object 112 moving in a trajectory 114 indicative of a desired input. For example, if the user 108 desires to input the letter "m", the user may move the object 112 in the trajectory 114 by writing the letter "m" in space. It should be appreciated that the object 112 may be any object accessible to the user 108 such as a ball, a piece of fruit, a controller device, or even the user's hand. In some embodiments, a color of the object 112 has a high contrast from a background viewed by the sensing device, thus making the object visually distinguishable from the background.

With continued reference to FIG. 1, the interactive media device 104 may be any computing device capable of executing computer-executable instructions. The interactive media device 104 may include a personal computer, a server, a game console, a set top box, personal digital assistant (PDA), media device, a smart phone, tablet computer, and/or television. It should be appreciated that in some instances, the display device 106 may be contained within the interactive media device 104. In some implementations, the interactive media device 104 may be in communication with one or more network node(s) via a network 116. As illustrated in FIG. 1, the interactive media device 104 may communicate with one or more servers 118 via the network 116 to access media for display on the display device 106.

In an exemplary environment, interactive media device 104 may include one or more processors 120 and system memory 122. Depending on the configuration and type of server, system memory 122 may be volatile (such as RAM), non-volatile (such as ROM, flash memory, etc.) or some combination of the two. System memory 122 may include a tracking module 124 and an input recognition module 126 to translate the trajectory 114 into an input recognizable by the interactive media device 104 as described herein.

Tracking module 124 may identify the object 112 and track the trajectory 114 as the user 108 moves the object through space in a trajectory indicative of a desired input (e.g., a letter, a number, an Asian symbol, etc.). In some embodiments, tracking module 124 identifies the object 112 and tracks the trajectory 114 via the visual sensing device 102. Depending on the configuration of the interactive media device 104, any type of communication medium such as a wired or wireless connection may enable the visual sensing device 102 to communicate with the interactive media device 104.

The tracking module 124 may identify the object 112 by calibrating the interactive media device 104 as described further below. Once the tracking module 124 calibrates the object 112, the tracking module 124 may track and record the trajectory 114 of the object 112.

In some embodiments, the tracking module 124 may display a sensed environment 128 on the display device 106. In some embodiments, the sensed environment 128 may include a sensed user 128a, a sensed trajectory 128b, and a sensed object 128c. Alternatively, the sensed environment 128 may include the sensed trajectory 128b and not the sensed user 128a. In some embodiments, the sensed environment 128 is displayed while the visual sensing device 102 senses the trajectory 114. For example, tracking module 124 may use the visual sensing device 102 to display a live video stream of the user and the trajectory 114 to the display device 106.

It should be appreciated that the tracking module 124 may extract and record the trajectory 114 using visual or inertial based sensing devices. For example, the visual sensing device 102 may be a web-camera, a cell phone camera, a video recorder, a digital camera, and so forth. In further embodiments, tracking module 124 may use inertial sensors embedded in the object 112 itself to record the trajectory 114 as described further below with reference to FIG. 2.

As described above, the system memory 122 may include an input recognition module 126 to translate the trajectory 114 into an input recognizable by the interactive media device 104. The input recognition module 126 may include a handwriting recognition module 130, a gesture recognition module 132, or a combination of both to analyze and translate the trajectory 114. For example, if the user 108 moves the object 112 in a trajectory that writes the letter "m", the handwriting recognition module 130 may translate the trajectory into the letter "m", among other possibilities. Specifically, as described further below, the input recognition module 126 may use both the static and dynamic information extracted from the trajectory 114 to translate it into suggested inputs such that the user 108 may select the desired input from among the suggested inputs.

The system memory 122 may additionally include a communications module 134. The communications module 134 may communicate the translated input to the interactive media device 104. For example, if the input recognition module 126 translates the trajectory 114 as the letter "m", the communications module 134 may type the letter "m" into an input box 136 of the interactive media device 104.

Figure 2:
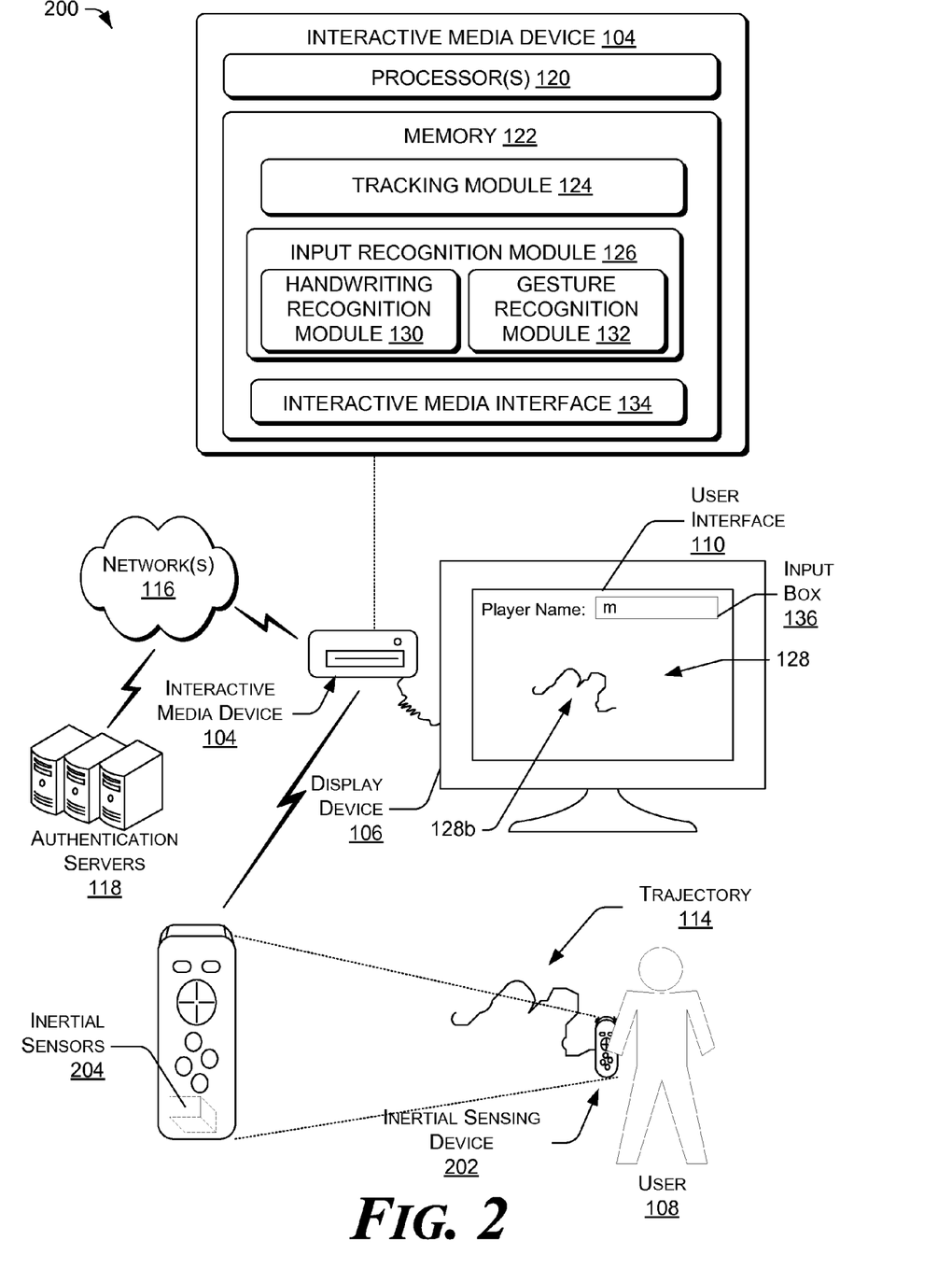
FIG. 2 is an illustrative interactive media device for recognizing input data based on movement of an object sensed by an inertial sensing device.

FIG. 2 is a further illustrative environment 200 for recognizing input data. As noted above, tracking module 124 may use inertial sensors 204 embedded in the object 112 itself to sense the trajectory 114 in addition to or alternative to using a camera. As illustrated in FIG. 2, the inertial sensing device 202 may be a sensing controller (e.g., a gaming device controller, a remote control, etc.) in communication with the interactive media device 104. Depending on the configuration of the interactive media device 104, any type of communication medium such as a wired or wireless connection may enable the inertial sensing device 202 to communicate with the interactive media device 104.

As the user 108 moves the inertial sensing device 202 in a trajectory 114 indicative of a desired input, one or more inertial sensors 204 of the inertial sensing device 202 may sense the trajectory 114. In some embodiments, the inertial sensors 204 of the inertial sensing device 202 may include an accelerometer and/or a gyroscope to sense the trajectory 114 of the inertial sensing device.

The tracking module 124 may extract and record the trajectory 114 sensed by the inertial sensing device 202. In some embodiments, the tracking module 124 may display the sensed environment 128 on the display device 106. For example, the tracking module 124 may display the sensed trajectory 128b for convenience to the user 108.

The input recognition module 126 may translate the recorded trajectory 114 into an input recognizable by the interactive media device 104. The communications module 134 may communicate the translated input to the interactive media device 104. In this manner, the communications module 134 enables the user 108 to interact with the interactive media device 104 via the user interface 110 made visible via the display device 106.

For example, if the user 108 moves the inertial sensing device 202 in a trajectory 114 indicative of the letter "m", the input recognition module 126 may translate the trajectory as the letter "m" and the communications module 134 may communicate the letter "m" into the input box 136 of the interactive media device 104.

In accordance with one or more embodiments, the input recognition module 126 may translate the trajectory 114 of the inertial sensing device 202 into various suggested inputs. The user 108 may select the desired input from among the suggested inputs.

Although FIG. 1 and FIG. 2 illustrate the interactive media device 104 recognizing the trajectory 114 as a textual input, it should be appreciated that the trajectory may alternatively represent a navigational input to control a navigational feature of the interactive media device, which is described below.

Figure 3:
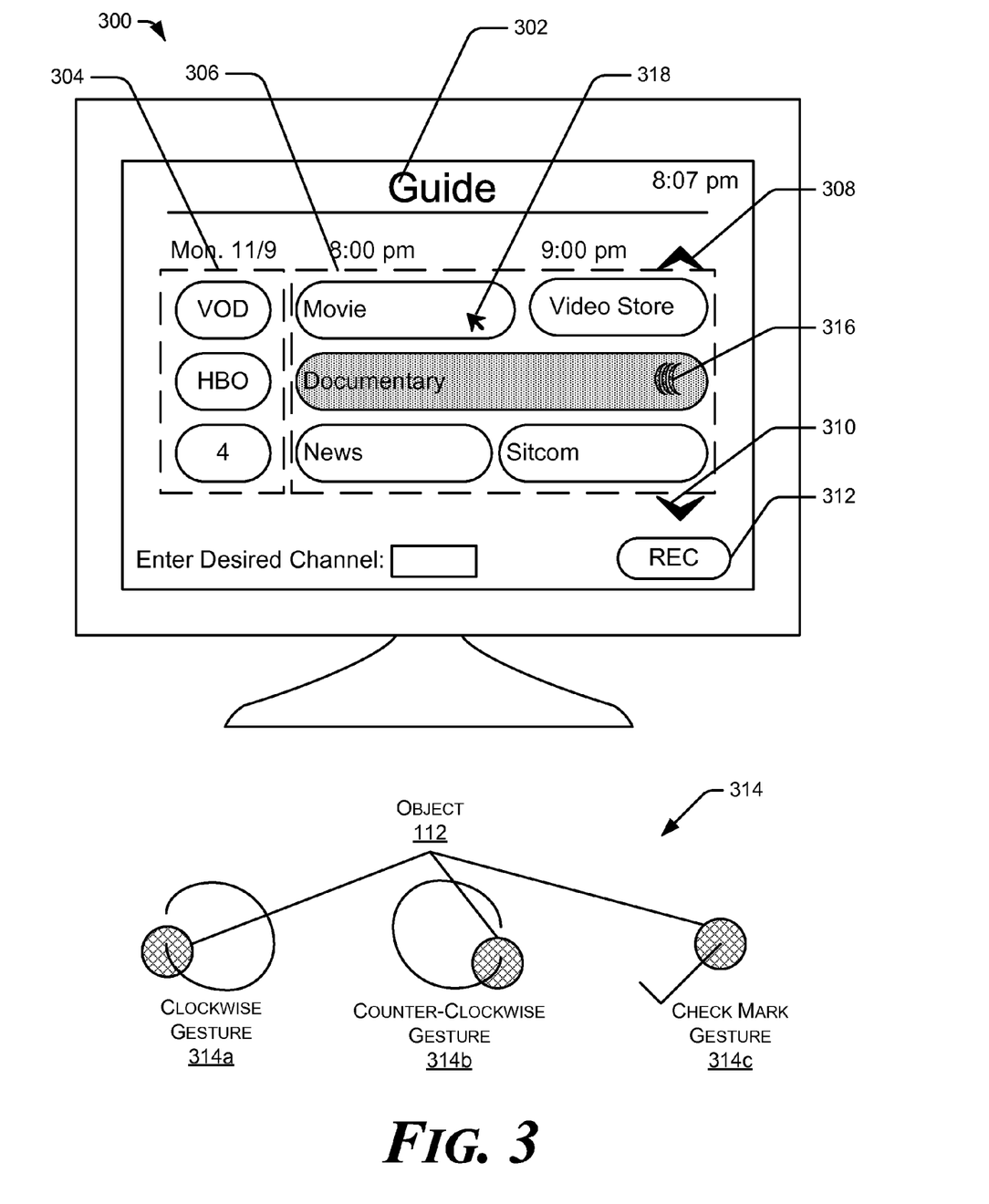
FIG. 3 is an illustrative interactive media device for recognizing navigational commands based on gestured movement of an object.

FIG. 3 is a further illustrative environment 300 for recognizing input data. The environment 300 may be performed by the interactive media device 104 of FIG. 1 and/or FIG. 2. As illustrated in FIG. 3, the user interface 106 may include an electronic programming guide 302. The electronic programming guide 302 includes various channels 304 for selection as well as a title of broadcast program 306 associated with the various channels 304. The electronic programming guide 302 also includes various navigational features such as a scroll up icon 308, a scroll down icon 310 and a record icon 312.

A user may make a gesture 314 indicative of a navigational command with an object. For example, the user 108 may make a clockwise gesture 314a indicative of a scroll up command equivalent to a user clicking on the scroll up icon 308 of the electronic programming guide 302. Alternatively, the user 108 may make a counter-clockwise gesture 314b indicative of a scroll down command equivalent to a user clicking on the scroll down icon 310. Alternatively, the user 108 may make a check mark gesture 314c indicative of a navigational command to record a highlighted program 316. Although sample gestures are provided above, other gestures may be used to communicate various commands to the interactive media device 104, thus enabling the user 108 to control aspects of the interactive media device.

In addition to using the gestures 314 to control navigational features of the interactive media device 104, the object 112 may additionally be used to control a cursor 318. For example, if the user 108 desires to watch the Video On Demand (VOD) Movie of FIG. 3 which starts at 8:00 pm, the user may move the object 112 such that the cursor 318 is displayed over the desired Movie on the display device. In such an embodiment, the interactive media device 104 is used to track a movement of the object 112 and move the cursor 318 around as the object moves. For example, if the user 108 moves the object 112 from left to right, the cursor 318 will also move from left to right following the object. The user 108 may then select the movie for viewing by pressing a button on a controller device when the cursor 318 is positioned over the movie on the display device.

A controller device may be used by the interactive media device 104 to determine whether the user 108 is making a gesture 314 indicative of a command input or whether the user 108 is simply intending to move the cursor 318. For example, if user 108 presses and holds down a button on a controller device then the movement of the object 112 will be interpreted as a gesture 314 indicative of a command input. The user 108 may then release the button on the controller device to indicate that they are finished gesturing the command input.

As illustrated above in FIG. 1 and FIG. 2, a sensing device such as the visual sensing device 102 of FIG. 1 and/or the inertial sensing device 202 of FIG. 2 may sense the gesture 314. The tracking module 124 may track and record the gesture, the input recognition module 126 may translate the gesture into a navigational input and the communications module 134 may communicate the navigational input to control a navigational feature of the interactive media device 104.

In some embodiments, the gesture recognition module 132 translates the gesture into a navigational input. For example, the gesture recognition module 132 may include a database of gestures and their equivalent navigational inputs. Similar to the textual input, it should be appreciated that the gesture recognition module 132 may translate the gesture 314 into suggested gestures such that the user 108 may select a desired gesture from among suggested gestures. Although FIG. 3 illustrates gestures 314, it should be appreciated that any gestures recognizable by the input recognition module 126 may be used in accordance with the interactive media device 104 as described herein.

Illustrative Operation

Figure 4:
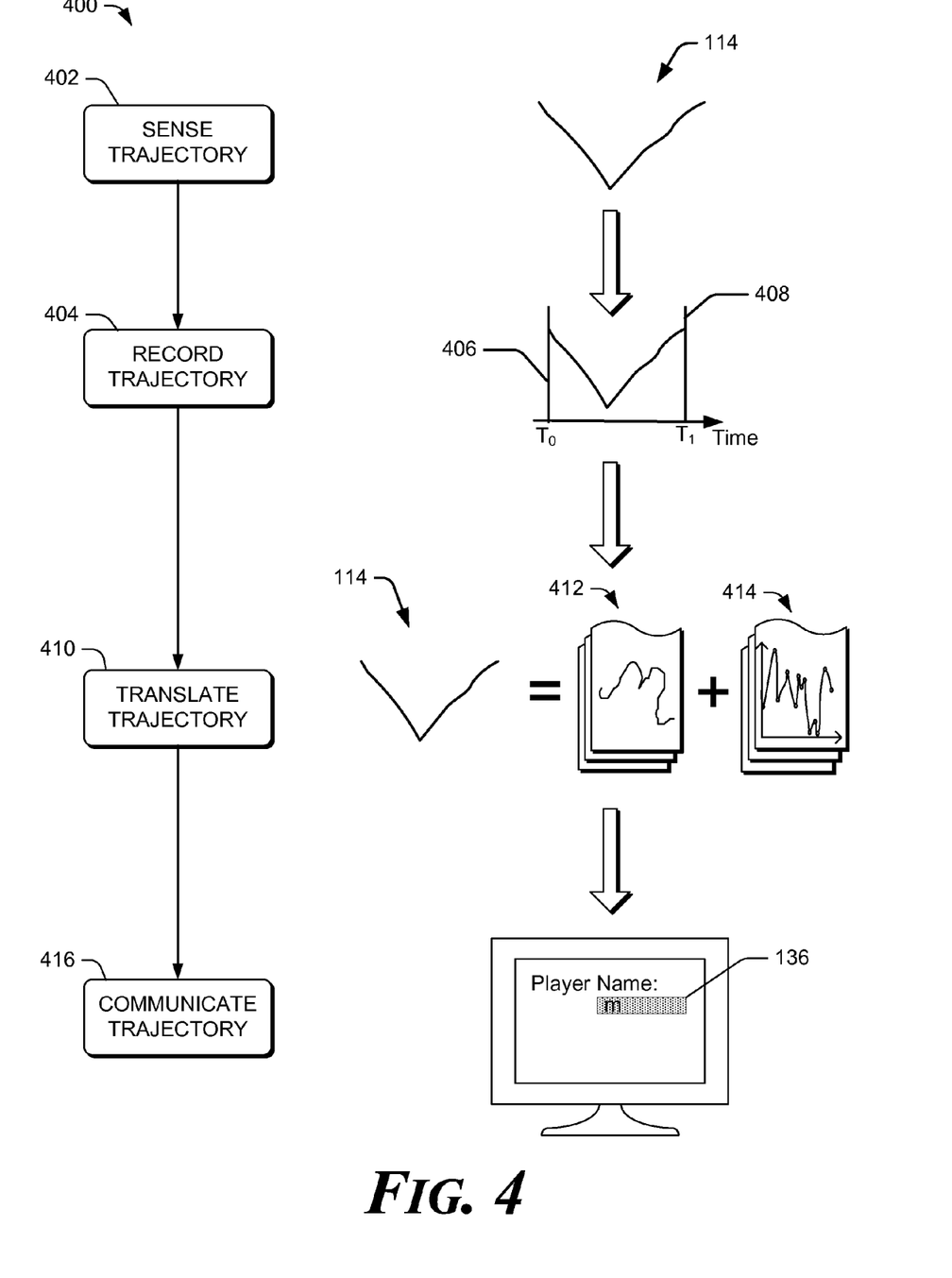
FIG. 4 is a flow diagram of an illustrative process to recognize a desired input.

FIG. 4 is a flow diagram of an illustrative process 400 of implementing components of a system that includes sensing, recording, translating, and communicating a user motioned trajectory indicative of a desired input to an interactive media device in accordance with embodiments of the disclosure. The process 400 is illustrated as a collection of blocks in a logical flow graph, which represents a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 400, shall be interpreted accordingly. The process 400 will be discussed with reference to the environments of FIG. 1-3.

At 402, the interactive media device 104 senses the trajectory 114 of the object 112 as the user 108 moves the object in a trajectory indicative of a desired input. In some embodiments, the visual sensing device 102 may sense the trajectory 114 of the object 112 as illustrated in FIG. 1. Alternatively, the inertial sensing device 202 may sense the trajectory 114 using the inertial sensors 204 such as an accelerometer and/or a gyroscope as illustrated in FIG. 2.

At 404, the interactive media device 104 records the trajectory 114 sensed at 402. The tracking module 124 may track, extract and record the trajectory 114 at 404. In some embodiments, the tracking module 124 analyzes the multi-frame video sequence captured by the visual sensing device 102 to extract and record the trajectory 114. Alternatively, the tracking module 124 may extract and record the trajectory 114 by analyzing a sequence of signals sensed by accelerometer and/or gyroscope.

In some embodiments, the interactive media device 104 may use trigger signals to record the trajectory at 404. For example, if one desires to input the letter "v" to the interactive media device, the user may send a start input signal 406 (such as at time $T_0$ as illustrated in FIG. 4) to indicate a start of the trajectory. Upon receipt of the start input signal 406, the interactive media device 104 may start recording the trajectory 114. Furthermore, the user may subsequently send a stop input signal 408 (such as at time $T_1$) to indicate an end of the trajectory. Upon receipt of the stop input signal 408, the interactive media device 104 may stop recording the trajectory 114. In this manner, the interactive media device only records the trajectory between the times $T_0$ and $T_1$.

The user may send the start input signal 406 and the stop input signal 408 to the interactive media device 104 via a controller device or via a gesture which is able to communicate with the interactive media device.

At 410, the interactive media device 104 translates the trajectory 114 into a recognizable input. The input recognition module 126 may translate the trajectory 114 at 410. In some embodiments, the input recognition module 126 may smooth or otherwise enhance the trajectory 114 at 410 prior to translating the trajectory into an input recognizable by the interactive media device.

In accordance with one or more embodiments, the input recognition module 126 may perform one or more of a static recognition 412 and a dynamic recognition 414 to translate the trajectory 114 at 410. The static recognition 412 may be designed to be insensitive to variabilities of the desired input such as the number of strokes in the desired input or the order of the strokes comprising the desired input. The dynamic recognition 414 may treat the trajectory 114 as a temporal sequence of points. Such dynamic recognition 414 may desirably utilize the sequential information of the trajectory 114 to improve the recognition accuracy of the handwriting input with a writing style similar to certain training samples of the desired input. The results of the static recognition 412 and the dynamic recognition 414 may be consolidated by a fusion module of the input recognition module 126 to perform a complete translation of the trajectory at 410.

In some embodiments, such as illustrated in FIG. 1 and FIG. 2, the trajectory 114 is indicative of a textual input to the interactive media device 104. In such instances, a recognition module such as the handwriting recognition module 130 of FIG. 1 and FIG. 2 translates the trajectory 114 at 410. For example, if the user 108 moves an object in a trajectory that writes the letter "v", the handwriting recognition module 130 may translate the trajectory at 410 into the letter "v". It should be appreciated that the handwriting recognition module 130 may translate the trajectory 114 into various suggested inputs such that the user 108 may select the desired input from among the suggested inputs as illustrated further below in FIG. 5.

In some embodiments, such as illustrated in FIG. 3, the trajectory 114 is a gesture indicative of a navigational command to a navigational feature of the interactive media device 104. In such instances, a recognition module such as the gesture recognition module 132 of FIG. 1 and FIG. 2 translates the gesture into a navigational input at 410. For example, if the user 108 moves an object in a clockwise gesture, the gesture recognition module 132 may translate the gesture into a scroll up navigational input at 410. Similar to the textual input, it should be appreciated that the gesture recognition module 132 may translate the gesture into various suggested inputs such that the user 108 may select the desired gesture from among suggested gestures.

At 416, a media interface such as the communications module 134 communicates the trajectory 114 into an input recognizable by the interactive media device 104. In some embodiments, the communications module 134 may communicate a textual trajectory by communicating a translated input of the trajectory into an input box 136 of the interactive media device 104. For example, if the input recognition module 126 translates the trajectory 114 as the letter "v" at 410, the communications module 134 may type the letter "v" into the input box 136 of the interactive media device at 416.

In some embodiments, the communications module 134 may communicate a gestured trajectory by controlling a navigational feature of the interactive media device 104. For example, if the input recognition module 126 translates the gesture as a scroll up navigational input, the communications module 134 may scroll up on a screen of the interactive media device at 416.

Illustrative Interface

Figure 5:
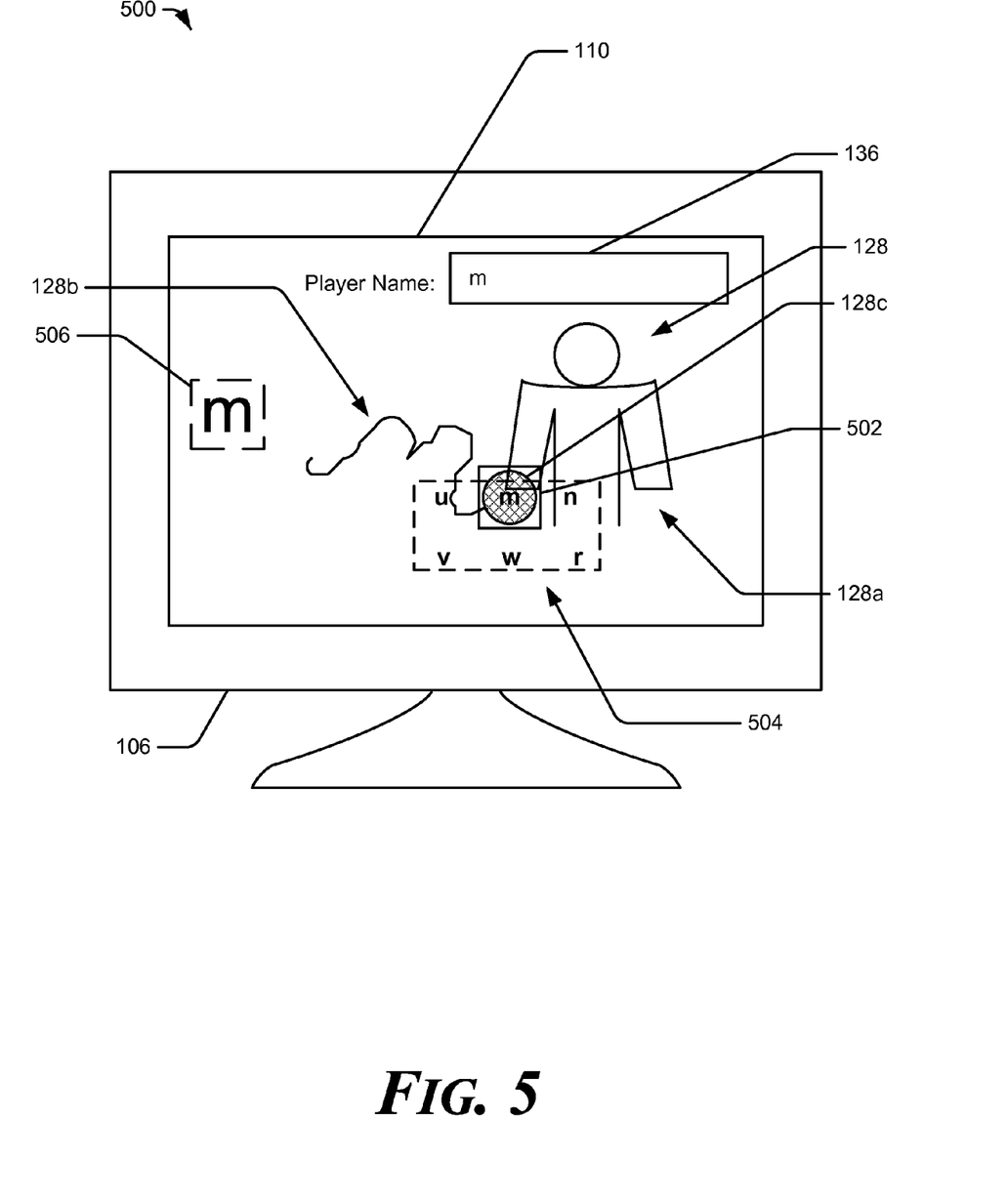
FIG. 5 is an illustrative recognition of input from various suggested inputs.
Figure 6:
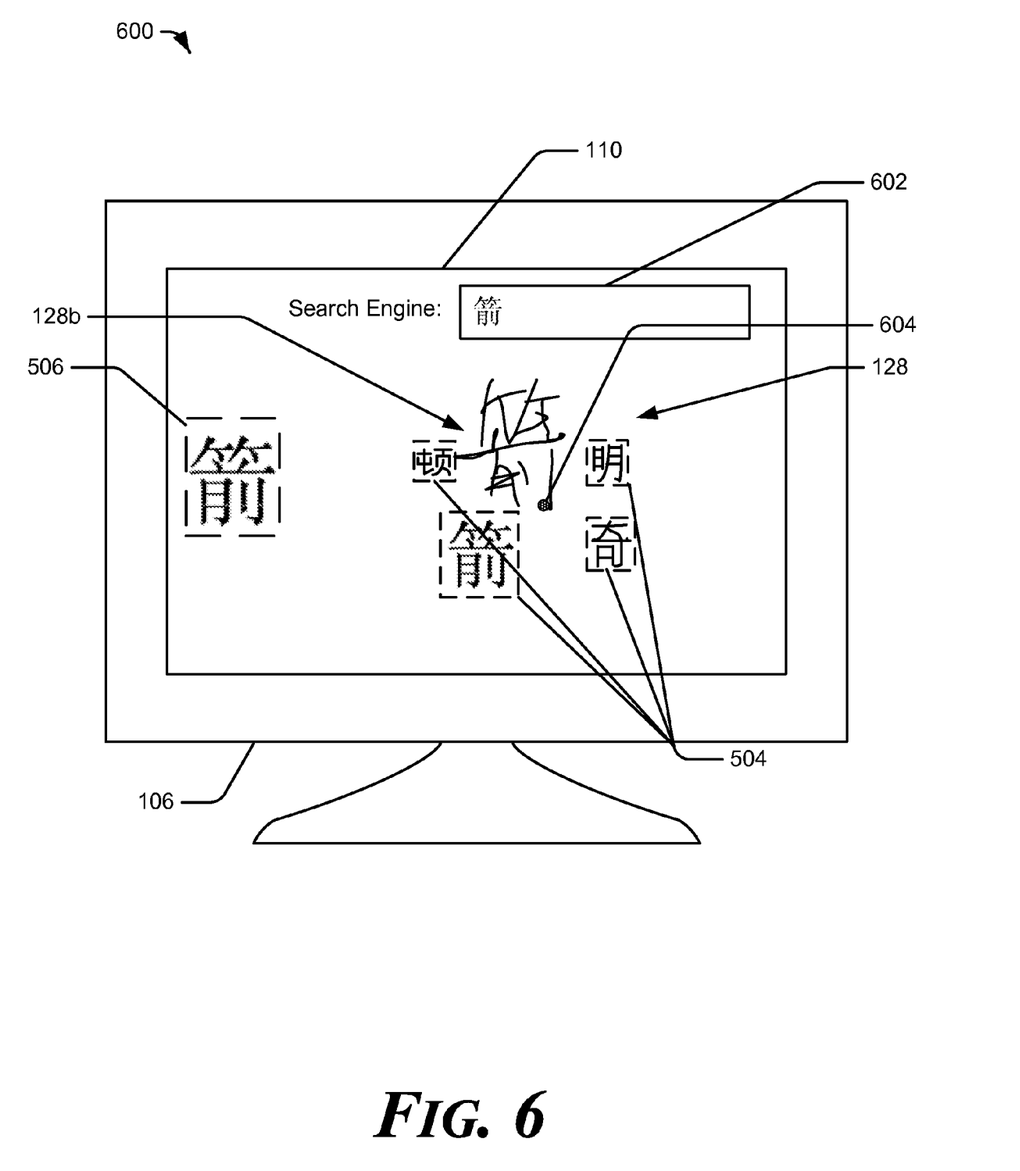
FIG. 6 is an illustrative recognition of an East Asian character input.

FIG. 5 and FIG. 6 illustrate an interactive media device recognizing input from various ways of interacting with an interactive media device. FIG. 5 and FIG. 6 may be used in accordance with one or more embodiments of the interactive media device 104 described herein.

FIG. 5 illustrates a visually based interactive environment 500 with an interactive media device 104 that includes recognizing an input as various suggested inputs. The visually based interactive environment 500 may be used in accordance with one or more embodiments of an interactive media device that utilizes a visual sensing device such as a camera to sense a trajectory indicative of a desired English language textual input.

As described above, a user may interact with the interactive media device 104 by moving an object in a trajectory indicative of a desired input for translation into an input recognizable by the interactive media device. The visually based interactive environment 500 of FIG. 5 may enable the user 108 to interact with the interactive media device 104 via the user interface 110 made visible via the display device.

In accordance with various embodiments, the tracking module 124 may display the sensed environment 128 on the display device 106 to assist the user in interacting with the interactive media device 104. For example, the sensed environment 128 may display the sensed user 128a, the sensed trajectory 128b, and the sensed object 128c. The sensed environment 128 may be displayed via the visual sensing device 102 such as illustrated above with reference to FIG. 1.

In some embodiments, the interactive media device 104 may be calibrated to identify and visually track the object 112. In order to calibrate the interactive media device 104, the user may transmit a calibration trigger event to the interactive media device 104. Once received, the interactive media device 104 may display a calibration zone 502 on the display device 106 to indicate that the interactive media device is ready for calibration. Once the calibration zone 502 is displayed, the user 108 may align the sensed object 128c inside of the calibration zone 502 by moving the object 112 to a corresponding position in space. The calibration zone 502 may then enable the interactive media device 104 to lock-in on the object 112 to initiate tracking of the object. Once the interactive media device 104 locks-in on the object 112, the interactive media device may display a target marker in a center of the sensed object 128c on the display device 106. The target marker may be a "tip of the pen" used to track the object 112 once the user 108 starts writing the desired input.

After the interactive media device 104 is calibrated, the user 108 may transmit the start input signal 406 indicating that the user is starting to write the desired input. Once the interactive media device 104 receives the start input signal 406 the tracking module 124 may begin recording the trajectory 114. Once the user 108 is finished writing the desired input, the user may transmit the stop input signal 408 to stop the recording of the desired input.

The calibration trigger event, start input signal 406 and stop input signal 408 may be transmitted to the interactive media device 104 via a controller device or via a gesture which is able to communicate with the interactive media device.

A presence of the sensed environment 128 may be displayed when the user 108 moves the object 112. The sensed environment 128 may then disappear upon execution of the desired input data.

In addition to displaying the sensed environment 128, the visually based interactive environment 500 may additionally include displaying suggested characters 504 on the display device 106. In some embodiments, the suggested characters 504 are determined by the input recognition module 126. For example, if the desired input trajectory 114 represents the letter "m", such as illustrated in FIG. 5, the input recognition module 126 may translate the trajectory 114 into the suggested characters 504: "m", "u", "n", "v", "w", or "r". In such instances, the suggested characters 504 may be presented to the user 108 for selection of the desired input.

Although FIG. 5 illustrates the suggested characters 504 displayed in two rows, the suggested characters may be displayed using various display methods. For example, the input recognition module 126 may rank the suggested characters 504 based on a likelihood of being an intended input. The interactive media device 104 may then arrange the ranked suggested characters on the display device 106 according to their rank. The suggested characters 504 may then be positioned such that a top ranked suggested character, i.e. the suggested character most likely to be the desired input, is closest to an end point of the sensed trajectory 128b for easy selection by the user 108. Alternatively, the interactive media device 104 may display the suggested characters 504 on the display device such that the suggested characters are of various sizes. For example, a top ranked suggested character may be a biggest suggested character on the display device 106.

The user may use various methods to select the desired input from the suggested characters 504. In some embodiments, the user 108 may position the sensed object 128c over the desired input on the display device 106 and transmit an accept signal to indicate that the desired input is the suggested character closest to the sensed object 128c. Alternatively, the user 108 may select the desired input from among the suggested characters 504 by "touching" the sensed object 128c to the desired input. In some embodiments, each of the suggested characters 504 may be represented by a unique button on a controller device to enable the user 108 to select the desired input by pressing a button on a controller device corresponding to the desired input. Further, the user 108 may position the sensed object 128c over the desired suggested character and then transmit an accept gesture, such as making an "x" mark with the object, to indicate that the desired input is the suggested character closest to a start position of the accept gesture.

In accordance with some embodiments, the suggested characters 504 may be made visible when the input recognition module 126 recognizes the trajectory 114 as multiple suggested characters 504. For example, the suggested characters 504 may not be visible when the user 108 is generating the desired input trajectory 114. The suggested characters 504 may then appear upon completion of the desired input trajectory 114, as indicated by receipt of the stop input signal 408, and remain visible until the user 108 selects the desired input from among the suggested characters 504.

Once the desired input is determined, the interactive media device 104 may translate the desired input into an input recognizable by the interactive media device 104 and communicate the input to an interactive feature of the interactive media device. For example, if the desired input is the letter "m", then the interactive media device 104 may type the letter "m" into an input box 136 on the display device 106.

In addition to communicating the desired input to the input box 136, the interactive media device 104 may additionally display the desired input in a resultant window 506 displayed on the display device 106. In some embodiments, the resultant window 506 may be larger than the input box 136 to emphasize the last character communicated to the input box 136.

A presence of the resultant window 506 may be based on a communication of the desired input to the interactive media device 104. For example, the resultant window 506 may only be visible for a predetermined time period upon determination of the desired input by the input recognition module 126. Alternatively, the resultant window 506 may only be visible for a time period starting from when the input recognition module 126 receives the desired input from the user 108 and ending when either the input recognition module determines the next desired input or there is an indication that the user is done inputting.

Although FIG. 5 illustrates recognizing the desired input trajectory 114 as an English language textual input, it should be appreciated that FIG. 5 may be implemented in situations where the desired input trajectory is a gesture indicative of a navigational command to a navigational feature of the interactive media device 104 or where the desired input trajectory is any character such as a letter of a Latin language, a number, a pictographic character set from any East Asian language in their traditional form (e.g., Chinese, Japanese, and Korean etc) or a symbol.

FIG. 6 illustrates an inertial based interactive environment 600 in accordance with one or more embodiments of an interactive media device that utilizes an inertial sensing device to sense a desired East Asian input. The inertial based interactive environment 600 may enable the user 108 to interact with the interactive media device 104 via the user interface 110 made visible via the display device. As illustrated in FIG. 6, the interactive media device 104 is an interactive television displaying a browser engine 602. A user may interact with the interactive media device 104 by entering a desired search string to the browser engine 602. For example if the user 108 desires to search on the word "arrow", the user may move the inertial sensing device 202 in a desired input trajectory 114 that writes the Chinese character for "arrow" in Chinese.

The interactive media device 104 may display the sensed trajectory 128b to assist the user 108 in writing the desired input. The interactive media device 104 may additionally display a target marker 604 to indicate where the inertial sensing device 202 is pointed. Similar to FIG. 5, the interactive media device 104 may receive a start input signal to start a recording of the desired input trajectory 602 by the tracking module 124 and a stop input signal to stop the recording of the trajectory. The start input signal 406 and the stop input signal 408 may be transmitted to the interactive media device 104 via a controller device which is able to communicate with the interactive media device.

The interactive user interface 600 may additionally display suggested characters 504 as determined by the input recognition module 126. For example, if the desired input trajectory 114 is the Chinese character for "arrow", such as illustrated in FIG. 6, the input recognition module 126 may translate the desired input trajectory 114 into the suggested characters 504 illustrated in FIG. 6 for selection of the desired input.

The input recognition module 126 may additionally rank the suggested characters 504 based on a likelihood of being an intended input and arrange the ranked suggested characters on the display device 106 according to their rank. For example, the interactive media device 104 may display a top ranked suggested character as a biggest suggested character of the suggested characters 504 on the display device 106. In such an embodiment, the user 108 may select the desired input from among the suggested characters 504 by "touching" the target marker 604 to the desired input. For example, if the user desires to search on the word "arrow", the user may select the Chinese character of "arrow" from among the suggested characters 504.

It should be appreciated that the suggested characters 504 maybe displayed and selected using any of the methods discussed above with reference to FIG. 5. For example, the user 108 may select the desired input by transmitting an accept signal when the target marker 604 is positioned over the desired input, "touching" the target marker 604 to the desired input, pressing a button on a controller device corresponding to the desired input, or gesturing an accept gesture with the object.

Once the desired input is determined, the interactive media device 104 may translate the desired input into an input recognizable by the interactive media device 104 and communicate the desired input to the interactive media device 104. For example, if the desired input is the word "arrow", then the interactive media device 104 may type the Chinese character for the word "arrow" into the browser engine 602.

In addition to communicating the desired input to the browser engine 602, the interactive media device 104 may additionally display the desired input in the resultant window 506 to emphasize the character communicated to the browser engine 602.

Illustrative Operation

Figure 7:
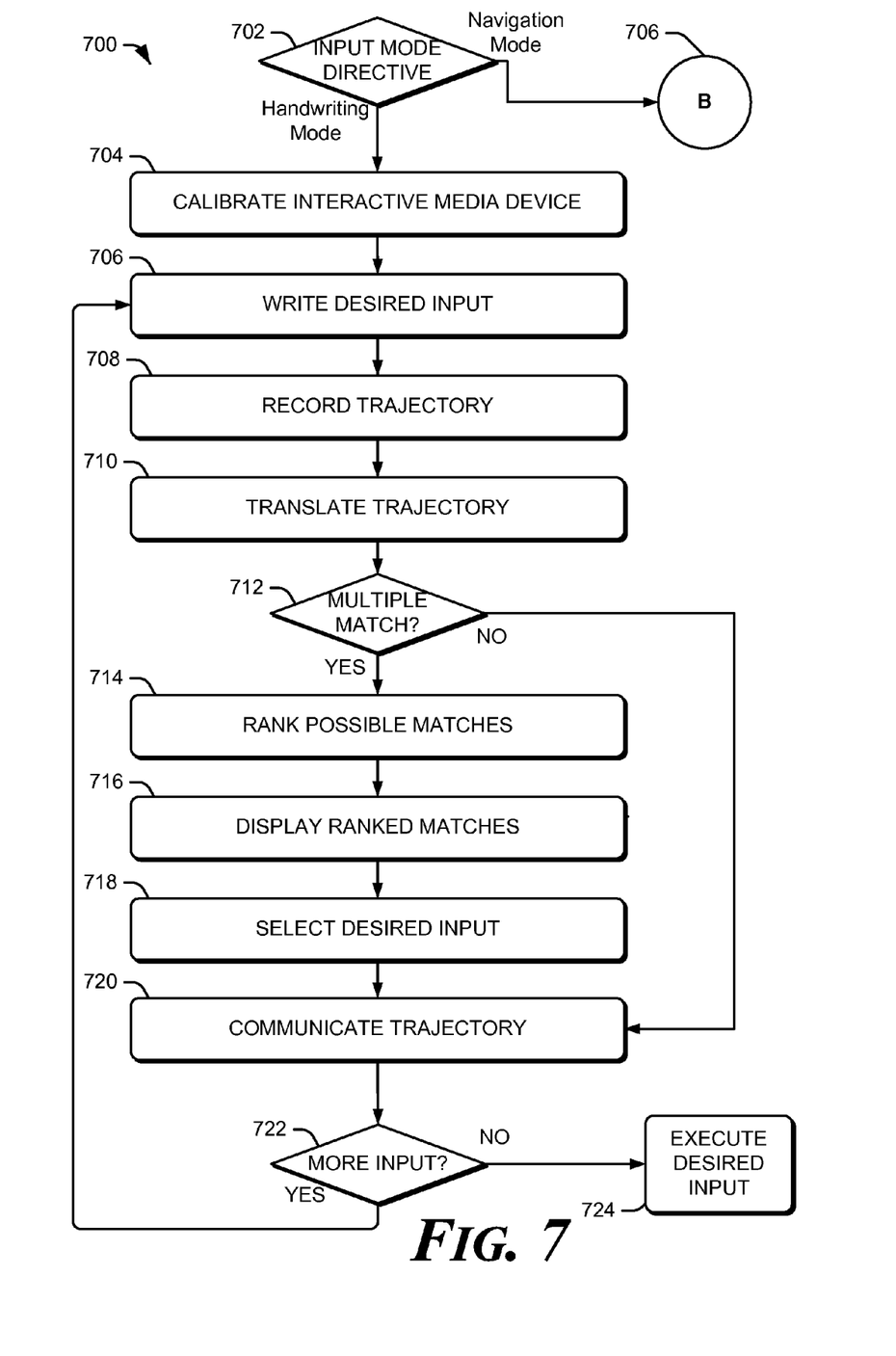
FIG. 7 is a flow diagram of an illustrative process to recognize desired input as navigational input or handwriting input.
Figure 8:
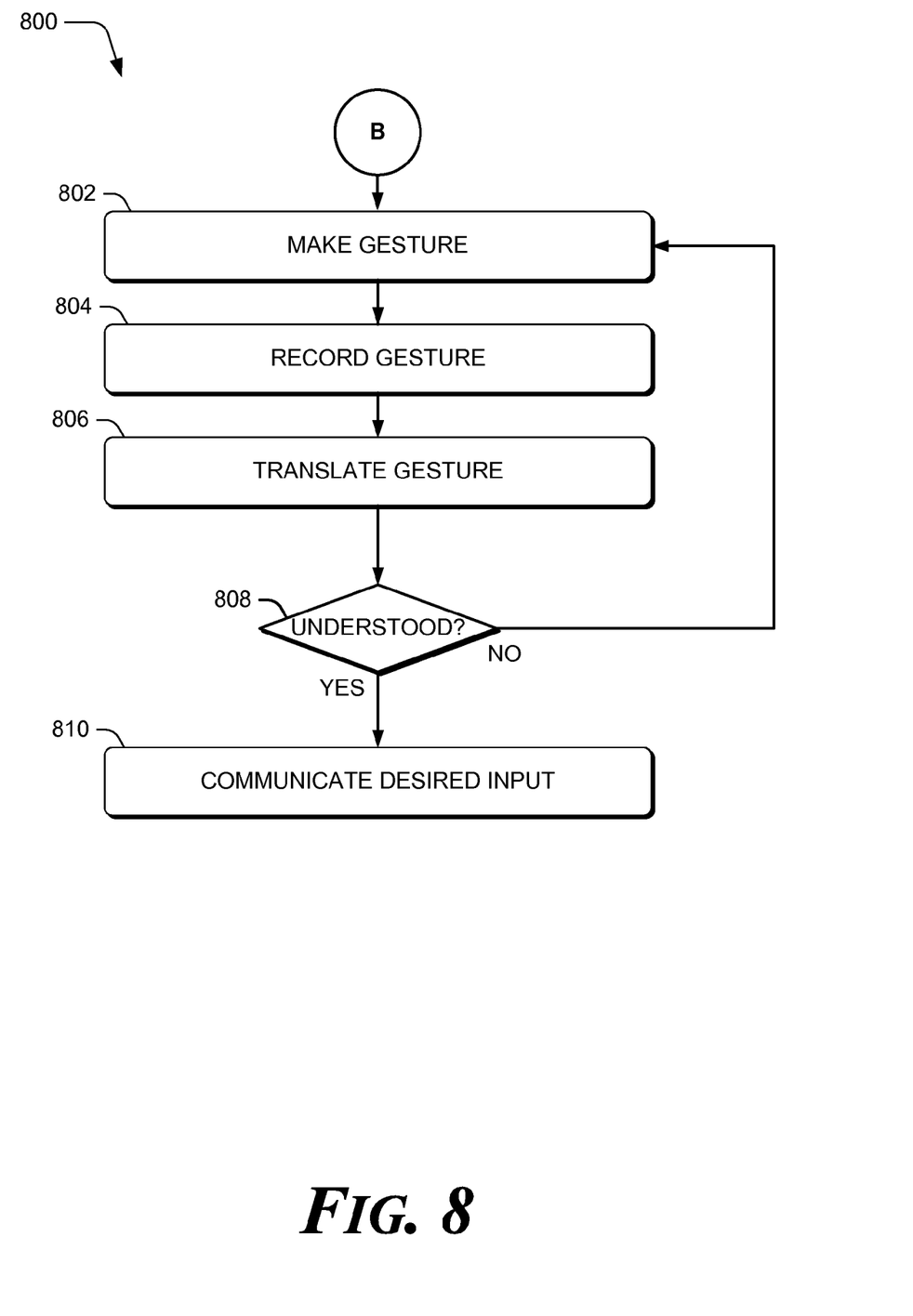
FIG. 8 is a flow diagram of an illustrative process to recognize desired input as navigational input.

FIGS. 7-8 describe various example processes for implementing the interactive media device 104. The order in which the operations are described in each example process is not intended to be construed as a limitation, and any number of the described blocks can be combined in any order and/or in parallel to implement each process.

FIG. 7 is a flow diagram of an illustrative process 700 to translate a desired input into an input recognizable by an interactive media device 104.

At 702, an input mode directive is received from the user 108. The user may send the input mode directive to the interactive media device 104 via a controller device or via a gesture which is able to communicate with the interactive media device. The input mode directive may indicate whether the user 108 desired to enter a textual input (e.g. handwriting mode branch of 702) such as typing into an input box or a gestured input (e.g. navigation mode branch of 702) such as a command to scroll up and down, etc. In some embodiments, the user 108 may transmit the input mode directive via a controller device. Alternatively, the user 108 may make a gesture with either an object or an inertial sensing device to transmit the input mode directive. If the input mode is the navigation mode, then the process continues to FIG. 8 at 706 where the user 108 gestures a navigational command. If the input mode directive is the handwriting mode, then the process 700 continues to 704.

It should be appreciated that elements 704-724 of FIG. 7 and the elements of FIG. 8 may be performed without receiving the input mode directive at 702. For example, a user may begin to input textual desired inputs without first providing the input mode directive at 702. Similarly, a user may begin to gesture navigational inputs without first providing the input mode directive at 702.

At 704, the interactive media device 104 may be calibrated to identify and visually track an object via a sensing device such as the visual sensing device 102. The tracking module 124 of FIG. 1 may calibrate the interactive media device 104 at 704. In this way, the tracking module 124, via the visual sensing device 102, may identify and visually track the object 112. In some instances, the user 108 may transmit a calibration trigger event to the tracking module 124 to display the calibration zone 502 used to calibrate the interactive media device 104. The user 108 may then hold up an object (e.g. an apple, a box of tissues, a book, a coffee mug, the user's finger, etc) such that the object 112 is substantially placed inside of the calibration zone 502 so that the tracking module 124 may lock-in the object.

At 706, the object 112 is used as a writing instrument to write the desired input in space by moving the object in a trajectory indicative of the desired input. For example, if a user desires to enter the letter "m" into an input box of an interactive gaming device, the user may pick up an apple and write the letter "m" in space (in the air) as if the apple were a piece of chalk and the user was writing the letter "m" on an imaginary chalk board.

At 708, the interactive media device 104 may record the trajectory 114. The tracking module 124 may extract the trajectory 114 from either a multi-frame video sequence or a sequence of accelerometer and/or gyroscope signals depending on whether the tracking module 124 is using the visual sensing device 102 or the inertial sensing device 202.

At 710, the trajectory 114 may be translated into suggested characters recognizable by the interactive media device 104. The input recognition module 126 may translate the trajectory 114 into the suggested characters 504 such as illustrated in FIG. 5 and FIG. 6. It should also be appreciated that if the input trajectory is a gestured motion such as illustrated in FIG. 3, the input recognition module 126 may translate the gesture 314 into various suggested gestures. In some embodiments, the input recognition module 126 may perform one or more of the static recognition 412 and the dynamic recognition 414 to translate the trajectory 114 at 710.

At 712, the interactive media device 104 may determine whether the trajectory 114 translates into multiple suggested characters. The input recognition module 126 may determine whether the trajectory 114 translates into multiple suggested characters. For example, if the desired input is the letter "m", the input recognition module 126 may recognize the trajectory 114 as possibly being the character "n" or the character "m" (e.g. the "yes" branch at 712). Alternatively, the input recognition module 126 may make a definite translation of the trajectory 114 at 712 in which case the process continues to block 720 (e.g. the "no" branch at 712). In some embodiments, the interactive media device 104 recognizes the trajectory 114 as a predetermined number of possible desired inputs (e.g. three suggested characters, etc.) in which case the process proceeds to block 714.

When multiple possible matches are recognized (e.g. the "yes" branch at 712), then the interactive media device 104 may rank the possible matches at 714 and display the ranked matches at 716 for selection. The input recognition module 126 may rank the matches at 714 and the communications module 134 may display the ranked matches at 716. In some embodiments, the input recognition module 126 may rank the matches at 714 based on a likelihood of being a desired input. The communications module 134 may use various methods to display the ranked matches such as positioning a top ranked match closest to an end point of the sensed trajectory 128*b* or displaying the top ranked match in a bigger font as compared with the other possible matches on the display device 106. It should be appreciated that the communications module 134 may use alternative methods to display the ranked matches at 716.

At 718, a user may select the desired input from among the possible matches. The user 108 may use various methods to select the desired input such as transmitting an accept signal when the sensed object 128c or the target marker 604 is positioned over the desired input on the display device 106, "touching" the sensed object 128c or the target marker 604 to the desired input, pressing a button on a controller device corresponding to the desired input, or gesturing an accept gesture with the object. It should be appreciated that the user 108 may use alternative methods to select the desired input at 718.

At 720, the desired input may be communicated to the interactive media device 104. The communications module 134 may communicate the desired input to an interactive feature of the interactive media device 104. For example, the communications module 134 may insert the selected desired input into an input box of the interactive media device at 720.

At 722, the interactive media device 104 determines whether the user 108 desires to enter another input. In some embodiments, interactive media device may receive a gesture or command from a controller device to indicate whether there is more input. When there is more input, then the process 700 may continue at 706 where the object is used as a writing instrument to write another desired input trajectory in space. Where there is no more input, then the process 700 may execute the desired input at 724.

FIG. 8 is a flow diagram of an illustrative process 800 to translate a gestured input into a navigational command recognizable by the interactive media device 104. As noted above, the process 800 of FIG. 8 may be realized when the input mode is set to navigation mode. In some embodiments, when the input mode is set to navigation mode, the cursor 318 may be displayed on the display device and the object 112 may become a "mouse" to navigate the cursor around on the display device in accordance with the movements of the object.

At 802, an object is used as a writing instrument to gesture a desired navigational command in space. For example, if a user desires to scroll up, the user may pick up an object such as an apple and motion the apple in a clockwise motion in space.

At 804, the interactive media device 104 may record the gesture. The tracking module 124 of FIG. 1 may record the gesture at 804. In some embodiments, the tracking module 124 may extract the gesture trajectory from a multi-frame video sequence captured by a visual sensing device such as a camera. Alternatively, the tracking module 124 may use an inertial sensing device such as a controller device having inertial sensors to extract and record the gesture trajectory.

At 806, the gesture may be translated into a navigational input recognizable by the interactive media device 104. The input recognition module 126 may translate the gesture at 806. In some embodiments, the gesture may be translated into suggested navigational inputs at 806 for selection of the desired navigational inputs. In some embodiments, 806 may analyze a static element and/or a dynamic element of the gesture for translation.

At 808 the input recognition module 126 determines whether the gesture translates into a recognizable navigational input. If the input recognition module 126 translates the gesture into a recognizable navigational input (e.g. "yes" at block 808), process 800 continues to block 810. If the input recognition module 126 fails to translate the gesture into a recognizable navigational input (e.g. "no" branch at 808), process 800 continues to block 802 where the user 108 can try gesturing the input again.

At 810, the navigational input may be communicated to a navigational feature of the interactive media device 104. For example, if the user makes a clockwise gesture with the object indicative of a scroll up navigational command, then the interactive media device may begin to scroll up on a user interface of the interactive media device made visible via a display device. In some embodiments, the interactive media device 104 may continue to scroll up while the user continues to make the clockwise gesture with the object. As soon as the user stops making the clockwise gesture with the object, the interactive media device may stop scrolling up.

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method comprising:
calibrating an interactive media device to identify and visually track:
an object moved through space by a user;
recording a trajectory of a movement of the object through space extracted from a multi-frame video sequence, the trajectory directly representing a desired handwritten character;
displaying the trajectory on a display device;
based at least in part on a shape of the trajectory, translating the trajectory into two or more suggested characters;
ranking each of the two or more suggested characters based on a likelihood that each of the two or more suggested characters are the desired handwritten character;
simultaneously displaying the two or more suggested characters on the display device so that display positions of each of the two or more suggested characters relative to an endpoint of the trajectory are based on the ranking of each of the two or more suggested characters, wherein the ranking is based on the likelihood that each of the two or more suggested characters are the desired handwritten character; and
receiving selection information indicating which of the two or more suggested characters represents the desired handwritten character.

2. The method as recited in claim 1, wherein calibrating the interactive media device comprises:
receiving a calibration trigger event;
displaying a calibration zone on the display device in response to the receipt of the calibration trigger event; and
locking-in on the object when the object is substantially placed inside of the calibration zone.

3. The method as recited in claim 1, wherein translating the trajectory into two or more suggested characters includes at least a static recognition element, a dynamic recognition element, and a combiner of multiple recognition elements.

4. The method as recited in claim 1, further comprising:
recording a gesture performed via the object, the gesture indicative of a navigational command;
translating the gesture into a navigational input; and
communicating the navigational input to control a navigational feature of the interactive media device.

5. The method as recited in claim 1, wherein translating the trajectory comprises one or more of smoothing the trajectory or enhancing the trajectory.

6. The method as recited in claim 1, further comprising calibrating the interactive media device to identify and visually track at least a portion of the user.

7. The method as recited in claim 1, further comprising displaying a live video stream of the at least a portion of the user with the trajectory on the display device.

8. One or more computer-readable memory devices comprising processor-executable instructions that, when executed, direct a device to perform actions comprising:
   receiving, from a visual sensing device, a video stream of a trajectory of an object moved through space by a user;
   receiving an input mode directive to designate object tracking as a handwriting mode;
   receiving a start input signal to start recording the trajectory of the object through space;
   receiving a stop input signal to stop the recording of the trajectory while continuing to receive the input signal of the trajectory of the object through space from the visual sensing device or the inertial sensing device, wherein a shape of the recorded trajectory of the object through space between the start input signal and the stop input signal represents a handwritten character;
   based at least in part on a shape of the recorded trajectory, translating the recorded trajectory into one or more suggested characters; and
   displaying the one or more suggested characters on a display device.

9. The one or more computer-readable memory devices of claim 8 wherein the processor-executable instructions, when executed, direct the device to perform further actions comprising
   individually ranking the one or more suggested characters based on a likelihood of the individual one or more suggested characters being an intended input such that a display area of a highest ranked suggested character is larger than a display area of a non-highest ranked suggested character on the display device.

10. The one or more computer-readable memory devices of claim 8, wherein a camera records a movement of the object through space as a multi-frame video sequence from which the trajectory is extracted.

11. The one or more computer-readable memory devices of claim 8, wherein the object includes the inertial sensing device and wherein the inertial sensing device records a movement of the object through space as a sequence of inertial sensor signals from which the trajectory is extracted.

12. The one or more computer-readable memory devices of claim 8, wherein the processor-executable instructions, when executed, direct the device to perform further actions comprising
   displaying a real-time image of the trajectory on the display device.

13. The one or more computer-readable memory devices of claim 8, wherein the processor-executable instructions, when executed, direct the device to perform further actions comprising:
   receiving selection information indicating which one of the one or more suggested characters is a command input recognizable by an interactive media device.

14. The one or more computer-readable memory devices of claim 13, wherein the processor-executable instructions, when executed, direct the device to perform further actions comprising
   inserting the one or more suggested characters into an input box of the interactive media device.

15. A method comprising:
   recording a trajectory of a movement of an object moved through space by a user, wherein the trajectory is extracted from a multi-frame video sequence via a camera, and wherein the trajectory directly represents a desired handwritten character;
   displaying the trajectory on a display device;
   based at least in part on a shape of the trajectory, translating the trajectory into a plurality of suggested inputs comprising characters;
   simultaneously displaying the plurality of suggested inputs on a display device so that display positions of the plurality of suggested inputs relative to an endpoint of the trajectory are based on a likelihood of each of the plurality of suggested inputs being the desired handwritten character;
   receiving a selection of the desired handwritten character, the desired handwritten character being one of the plurality of suggested inputs; and
   controlling an interactive media device via the desired handwritten character.

16. The method as recited in claim 15, wherein controlling the interactive media device comprises placing the desired handwritten character into an input box of the interactive media device.

17. The method as recited in claim 16, wherein the desired handwritten character is an East Asian character in a traditional form.

\* \* \* \* \*